US008053258B2

(12) United States Patent
Wilczek et al.

(10) Patent No.: US 8,053,258 B2
(45) Date of Patent: Nov. 8, 2011

(54) THICK FILM SEALING GLASS COMPOSITIONS FOR LOW TEMPERATURE FIRING

(75) Inventors: Lech Wilczek, Wilmington, DE (US); Ross Getty, Wilmington, DE (US); Phil Lynch, Rockland, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/689,792

(22) Filed: Jan. 19, 2010

(65) Prior Publication Data
US 2010/0115998 A1    May 13, 2010

Related U.S. Application Data

(62) Division of application No. 11/233,804, filed on Sep. 23, 2005, now abandoned.

(60) Provisional application No. 60/613,006, filed on Sep. 24, 2004, provisional application No. 60/620,266, filed on Oct. 19, 2004.

(51) Int. Cl.
*H01L 21/469* (2006.01)
(52) U.S. Cl. ............... 438/20; 445/24; 313/309
(58) Field of Classification Search ............ 428/20; 445/24; 313/309
See application file for complete search history.

(56) References Cited

U.S. PATENT DOCUMENTS

| 3,625,733 A | 12/1971 | Mansur |
| 4,267,086 A | 5/1981 | Pett |
| 4,521,251 A | 6/1985 | Otake |
| 4,681,656 A * | 7/1987 | Byrum ............... 216/65 |
| 4,939,021 A | 7/1990 | Aoki |
| 4,962,066 A | 10/1990 | Starz |
| 5,079,193 A | 1/1992 | Donohue |
| 5,344,592 A * | 9/1994 | Wilczek et al. ........... 252/512 |
| 5,518,663 A * | 5/1996 | LaBranche et al. ....... 252/514 |
| 5,985,460 A | 11/1999 | Wang |
| 6,183,871 B1 | 2/2001 | Lee |
| 6,409,567 B1 * | 6/2002 | Amey et al. .............. 445/50 |
| 6,858,981 B2 * | 2/2005 | Cho et al. ................. 313/495 |

FOREIGN PATENT DOCUMENTS
JP   02-124744   5/1990

OTHER PUBLICATIONS

J.W. Alpha, Glass Sealing Technologies for Displays, Optics and Laser Technology, 1976, pp. 259-264, vol. 8.
Kwon et. al., Plasma Display Panel Vacuum In-Line Sealing Technology by Using Bubble-Reduced Frit, J. Vacuum Sci. and Technology, A, 2003, pp. 206-211, vol. 21.
Korczynski, Manufacturing Emissive Displays, Soild State Technology, 1999, p. 54-56, vol. 51.
International Search Report and Written Opinion in PCT/US2005/034191, Feb. 8, 2006 (for Application Published as WO 2006/044109.

* cited by examiner

*Primary Examiner* — Satya Sastri

(57) ABSTRACT

The present invention is a composition that may be used for sealing applications in the manufacture of electronic devices. The composition includes organic vehicles that may be removed upon low temperature firing in air or inert atmospheres. The present invention is further a process for the use of the composition.

14 Claims, No Drawings

THICK FILM SEALING GLASS COMPOSITIONS FOR LOW TEMPERATURE FIRING

This application is a division of and claims the benefit of U.S. application Ser. No. 11/233,804, filed Sep. 23, 2005, which by this reference is incorporated in its entirety as a part hereof for all purposes.

This application claims the benefit of U.S. Provisional Application No. 60/613,006, filed on Sep. 24, 2004, and U.S. Provisional Application No. 60/620,266, filed on Oct. 19, 2004, each of which is incorporated in its entirety as a part hereof for all purposes.

TECHNICAL FIELD

The present invention relates to a composition that may be used for sealing applications in the manufacture of electronic displays. The composition includes organic vehicles that may be removed upon low temperature firing in air or inert atmospheres.

BACKGROUND

Compositions applied as a thick film paste are used in sealing sheets of glass in the manufacture of devices such as electronic displays. As described in sources such as Alpha, Glass Sealing Technologies for Displays, *Optics and Laser Technology*, 8, 259-264 (1976); Kwon et al, Plasma Display Panel Vacuum In-line Sealing Technology by Using Bubble-reduced Frit, *J. Vacuum Sci. and Technology*, A, 21, 206-211 (2003); and Korczynski, Manufacturing Emissive Displays, *Solid State Technology*, 51, 54-56 (1999), current compositions require organic vehicle burnout by firing in air at about 350° C. or higher, followed by sintering of glass frit at 430° C. or higher in nitrogen containing 10 to 1000 ppm of oxygen, and more typically 500 to 1000 ppm oxygen. Air firing has typically been required for burnout of the organic vehicle being used. It does not appear that the organic vehicles used in these compositions were functionally fugitive in the absence of oxygen, nor could they burn out in oxygen at lower temperatures.

A need thus remains for sealing compositions that can be fired at lower temperatures, and this invention thus provides such compositions comprising organic vehicles that may be removed at lower temperatures in air or inert atmosphere. It has been found that lowering the firing temperature, or the use of an inert atmosphere, reduces the potential for oxidation of other components of the device, which are subject to the firing cycle along with the sealing composition.

SUMMARY OF VARIOUS EMBODIMENTS OF THE INVENTION

One embodiment of this invention is a composition of matter comprising, in admixture, (a) glass frit, (b) a solvent, and (c) an organic vehicle selected from one or more members of the group consisting of a polystyrene, a polyolefin, a polyacrylate, a polyester, a polycarbonate, a polyol, a polyether, a polyacetal and a polyamide; wherein the organic vehicle has a molecular weight in the range of about 200 to about 1000.

Another embodiment of this invention is a sealing process comprising (a) depositing a bead or patterned layer of the composition of claim 1 on a substrate, (b) volatilizing the solvent and/or organic vehicle, and (c) firing the bead or patterned layer.

A further embodiment of this invention is a sealing process comprising (a) depositing a bead or patterned layer of the composition of claim 1 on a first substrate, (b) volatilizing the solvent and/or organic vehicle, (c) bringing a second substrate into contact with the bead or patterned layer, and (d) firing the bead or patterned layer.

DETAILED DESCRIPTION

The present invention provides a composition that includes glass frit, a solvent, and an organic vehicle selected from one or more members of the group consisting of a polystyrene, a polyolefin, a polyacrylate (including a polymethacrylate), a polyester, a polycarbonate, a polyol, a polyether, a polyacetal and a polyamide; wherein the organic vehicle has a molecular weight in the range of about 200 to about 1000.

The organic vehicle in the composition is thermally fugitive and/or pyrolyzes at low temperature. While pyrolysis usually involves the transformation of a material into other substances through the application of heat alone in the absence of oxidation, the organic vehicle as used herein is fugitive in air at a temperature of 430° C. or less. In particular embodiments where oxygen is excluded, such as an atmosphere of nitrogen or other inert atmosphere, the organic vehicle is also fugitive at a temperature of 430° C. or less. The organic vehicle is thermally fugitive when, after the composition is heated, the particles of glass frit are permitted to sinter together and form an appropriate adhesive contact with a substrate to be sealed by reason of the fact that there is a sufficiently small amount, if any, of the organic vehicle remaining in the composition that the presence of whatever amount does remain does not interfere with the desired adhesive contact to be made between the glass frits and the substrate.

Organic vehicles of particular interest include those such as a poly(alpha-methylstyrene) ("PAMS") or an oligomer thereof; a butylated poly(alpha-methylstyrene); and an oligomer derived from a methylmethacrylate. Polyols, low molecular weight polymers and oligomers containing a large number of hydroxyl groups (e.g. a polyhydric alcohol), that are useful in this invention typically include polyester polyols, polyether polyols, polyolefin polyols, polyglycols, polyglycerols and oligomers derived from sugar alcohols. When using a commercial glycerol, such as may be obtained from Sigma-Aldrich (St. Louis Mo.), however, it may be preferred to fire the composition in air rather than in nitrogen.

Suitable candidates for use as an organic vehicle in the composition of this invention may be identified by performing a thermo-gravimetric analysis of the composition. The lower the temperature needed for substantial or complete removal of the organic vehicle from the composition, the more likely that that organic vehicle will be a suitable candidate for a sealing application. This test should be carried out on the full composition, although the corresponding analysis of the organic vehicle by itself can also be used for guidance.

Glass frits typically contain finely ground inorganic materials mixed with fluxes, which are transformed into a glass or enamel upon heating. Suitable glass frits include those that contain materials such as $PbO$, $B_2O_3$, $Al_2O_3$, $SiO_2$ and $ZnO$, and may be obtained commercially from suppliers such as Viox, Asahi and DuPont. The median particle size (d50) of the glass frit is about 1 to about 100 microns (μm), is preferably about 1 to about 50 microns, and is more preferably about 1 to about 25 microns.

The composition will contain a suitable low boiling solvent, representative examples of which include an ester alcohol, hexane, heptane, toluene, methylene chloride, ethyl acetate, butyl acetate, methyl ethyl ketone and xylenes.

A filler such as silica or alumina may optionally be included in the composition to help manage the viscosity of the composition and/or provide desired functional characteristics.

The components of the composition may be present therein in amounts, by total weight of the composition, as follows: organic vehicle—about 1 to about 20 parts by weight (pbw) or about 5 to about 15 pbw, glass frit—about 60 to about 100 pbw or about 65 to about 95 pbw, solvent—about 1 to about 40 pbw or about 10 to about 25 pbw, and (when present as an optional component) filler—about 1 to about 5 pbw or about 1.5 to about 3 pbw; where the pbw may, but need not, add to 100.

These compositions can be used in bonding glass surfaces to each other for use, for example, in field emission devices or lighting devices. They provide highly reliable glass-to-glass seals, for example, in electronic display applications such as in flat panel displays, which contain electronic device elements such as electron field emitters. Typically, in a final assembly stage for flat panel displays, front and back glass substrate plates that together make up the outer structure of the display are sealed together with a sealing composition. The enclosed cavity between the glass plates containing other elements of the display is evacuated to a low gaseous pressure.

In a field emission display, the front and back glass substrate plates are also the anode and cathode of the display. Typically, the sealing composition is applied near the outer edges of the anode and cathode glass substrate plates as a printed or extruded thick film paste deposit. Alternatively, the sealing composition may be applied on the anode or cathode substrate only, and then the two substrate plates are brought in contact. Incorporation of an organic vehicle in the composition is necessary to enable proper deposit of the composition as a thick film paste in the desired location. The substrate plates may be brought together before or after volatilization of the organic vehicle and/or solvent, and the firing of the sealing composition. Volatilization of the organic vehicle and/or solvent may be performed by evaporation at ambient temperature or by drying at a low temperature such as about 125° C. Fired compositions may be refired to accomplish sealing.

After deposition of the composition, for example as a bead or patterned layer of a paste, low temperature elimination of the organic vehicle is particularly important in the case of field emission displays (FEDs) that comprise acicular emitting substances such as acicular carbon, e.g. single-wall or multi-wall carbon nanotubes (CNTs), as emitter elements. As firing temperature increases and in the presence of even very low levels of oxygen, CNTs and their electron emissivity degrade by oxidation. Other components of displays or other electronic devices can also be susceptible to degradation at elevated temperature, particularly in the presence of oxygen. Thus a sealing composition that is processed at lower temperatures, and/or that requires no oxygen, for adequate removal of the organic vehicle offers a strong practical advantage in display manufacture.

It is preferred that the composition of this invention provide a high vacuum seal between plates of glass such that the resulting cavity between the plates can be pumped down to about $10^{-7}$ torr vacuum or lower. In addition, it is further preferred that the composition, when fired in the manner described herein, will have a glossy surface. A composition that fires out with a matt surface appearance is less likely to provide acceptable sealing of the glass plates.

The advantageous effects of this invention are demonstrated by a series of examples, as described below. The embodiments of the invention on which these examples are based are illustrative only, and do not limit the scope of the appended claims.

EXAMPLES

Organic vehicles ("OV") for use in the following examples are prepared as described below. These OVs are different mixtures of PAMS, butylated PAMS and polymethacrylate oligomers, primarily dimers and trimers, as shown in Table 1.

TABLE 1

|  | Organic Vehicle | | | |
|---|---|---|---|---|
|  | 1-1 | 2-1 | 2-2 | 3 |
| Type | PAMS | Butylated PAMS | Butylated PAMS | Methacrylate Oligomers |
| Percent dimer | 60% | >95% | >90% | <1% |
| Percent trimer | 40% | <3% | <10% | >95% |
| Viscosity (Poise) | 4.0 | 26 | 71 | 6.0 |

Several variations of OV 1-1 are made and evaluated. They differ in their ratios of dimer to trimer as shown in Table 2:

TABLE 2

|  | Organic Vehicle | | |
|---|---|---|---|
|  | 1-1 | 1-2 | 1-3 |
| Percent dimer | 60% | 78% | 65% |
| Percent trimer | 40% | 22% | 35% |
| Viscosity (Poise) | 4.0 | 1.0 | 3.5 |

OVs 1-1, 1-2, 1-3, 2-1, 2-2 and 3, as obtained from DuPont (Wilmington Del.), are prepared according to the following procedures, as more particularly described in U.S. Pat. No. 5,344,592 and U.S. Pat. No. 5,397,383:

Preparation 1

OVs 1-1, 1-2 and 1-3

Preparation of Alpha-Methylstyrene Indan and Other Oligomers (AMSID and PAMS)

Alpha-methylstyrene (AMS) (2.0 L, 15.4 mole) is added slowly with stirring over 2 to 3 hours to a mixture of AlCl3 (0.7 g, 5.2 mmole) and dichloromethane (1.0 L, dried over 3 Å molecular sieves) in 4 L beaker, in a drybox at room temperature. After the addition of 1 L AMS, about 0.2 L dichloromethane is added to make up for the solvent evaporated due to the reaction exotherm. After the addition of all AMS, the reaction mixture is deactivated with 0.3 L methanol, washed three times with water, dried over calcium chloride, filtered and volatiles stripped first using a rotary evaporator and then high vacuum.

Yield is 1,685 g (93%) of colorless, transparent oil. The oligomer mixture is analyzed as containing 60.5% dimer; 1,1,3-trimethyl-phenylindan isomers (Registry No. 3910-35-8; GC/MS: Calc. 354.905, Found 354.234). 1H NMR (CDCl$_3$): ppm 0.8-2.7 (m, br, aliph 13H); 7.0-7.3 (m, br, arom, 11H). The viscosity of the mixture of compounds at 26°

C. is 782 cp and is adjusted to 880 cp by distilling off 57 g dimer on a Kugelrohr. When the mixture is distilled, the composition of the distillate is 56.4% dimer and 41.8% trimer of AMS.

Preparation 2

OVs 2-1 and 2-2

Preparation of T-Butyl and multi-t-Butyl-1,1,3-Trimethyl-3-Phenylindan (Butylated AMSID)

The reaction product from Preparation 1 is fractionally distilled to yield the dimeric form of AMSID, and is collected for use as a starting material for this preparation. A mixture of 1,1,3-trimethyl-3-phenylindan (53 g, 0.255 mole), 2-chloro-2-methylpropane (41.6 g, 0.449 mole), $AlCl_3$ (0.5 g, 3.76 mmole) and dichloromethane (60 mL, dried over 3 Å molecular sieves) is stirred for three days at room temperature in a drybox. The reaction mixture is deactivated with 10 mL methanol, diluted with 100 mL dichloromethane, washed four times with water, dried over calcium chloride, filtered and volatiles stripped first using a rotary evaporator and then high vacuum.

Yield is 53.5 g (68%) of yellow, transparent, viscous oil. The material is analyzed as containing 14% unreacted dimer; 43% t-butyl-1,1,3-trimethyl-phenylindan isomers (Registry No. 100404-45-3; GC/MS: Calc. 292.466, Found 292.200); and 33% di-t-butyl-1,1,3-trimethyl-phenylindan isomers (Registry No. 110528-60-4; GC/MS: Calc. 384.574, Found 384.279). With this preparation, up to about 10% impurities are formed as by-products of the reaction. Of the 10% impurities, none of the by-product compounds are more than about 1-2%. 1H NMR ($CDCl_3$): ppm 1.0-2.7 (m, br, aliph 19.7H); 7.1-7.5 (m, br, arom, 7.0H).

Preparation 3

OVs 2-1 and 2-2

Alternative Procedure

Preparation of T-Butyl and multi-t-Butyl PAMS Oligomers (Butylated PAMS) Using a One Pot/Two Step Process AMS (100 mL, 0.77 mole) is added slowly with stirring over 45 min to a mixture of $AlCl_3$ (0.2 g, 1.50 mmole) and 1,2-dichloroethane (100 mL) at 60-90° C. under nitrogen. After 1 h, GC showed no unreacted AMS, 79% indan dimer and 15% indan trimer isomers in the reaction system. The mixture is cooled down to room temperature. $AlCl_3$ (0.5 g, 3.75 mmole) and 2-chloro-2-methylpropane (10 mL, 0.119 mole) are added with stirring. After 3 hours, the reaction mixture is deactivated with 40 ml methanol, washed three times with water, dried over calcium chloride, filtered and volatiles stripped first using a rotary evaporator and then high vacuum.

Yield is 82 g (84%) of colorless, transparent oil. The material is analyzed to contain 60% indan dimer (unsubstituted); 19% t-butyl-1,1,3-trimethyl-phenylindan isomers (monosubstituted); and 11% indan AMS trimer isomers. The viscosity is 304 cp at 23° C. 1H NMR ($CDCl_3$): ppm 0.8-2.5 (m, br, aliph 12.8H); 6.9-7.3 (m, br, arom, 8.6H).

Preparation 4

OV 3

Preparation of Methylmethacrylate Vinylidene Trimer (Methacrylate Oligomers)

Methylmethacrylate (8 g) and methylethyl ketone (5 g) are charged into the reactor equipped with stirrer, reflux condenser, thermocouple, under nitrogen positive pressure, and heated at 80° C. When temperature is stabilized at 80° C., diaquabis(borondifluorodiphenylglyoxymato) cobaltate (II), Co(DPG-BF2)2, (KG-10618) (0.1 g) in methylethyl ketone (10 g) is added. Then methylmethacrylate (40 g) and Vazo 52 (4 g) in methylethyl ketone (13 g) are fed concurrently into the reactor over 240 and 300 min., respectively. After completing the addition of the Vazo 52, the reactor contents are held at 80° C. for an additional 30 min. The reaction mixture is analyzed by GC, SCFC and 1H NMR. Methylmethacrylate conversion is 60% and the vinylidene oligomer distribution by GC is: 68% dimer, 29% trimer and 3% tetramer. The trimer fraction with purity >90% is isolated by distillation on a Kugelrohr. $^1$H NMR analysis indicates the desired structure (Polymer Prep. 36 (2), 106-7 (1995)).

Examples 1~10

Tables 3 and 4 summarize the content of the compositions prepared for Examples 1-10 as various formulations of sealing compositions incorporating thermally fugitive OVs. These compositions are made into thick film pastes and tested for sealing performance between plates of soda-lime glass.

All compositions use glass frits obtained from Viox Corporation (Seattle Wash.) that contained PbO, $B_2O_3$, $Al_2O_3$, $SiO_2$, and ZnO. The Viox frit number 24935 additionally contained $PbF_2$. The PbO content is greater than 50% by weight. Viox frit number 24927 used in Examples 1, 3, 4 and 5 has a median particle size of 5 µm. Viox frit number 24927 with median particle sizes of 1.7 µm, 5 µm and 10 µm is also evaluated for corresponding performance. The Cab-O-Sil M® fumed silica used is from the Cabot Corporation (Boston Mass.).

5.50 grams of glass frit are added to 0.50 gram of an OV together with 1.00 gram of Texanol® solvent (an ester alcohol from Eastman Chemical Company, Rochester, N.Y.). The mixture is mulled in a thick film paste muller. For making larger amounts of thick film paste, other dispersion procedures may be used, such as mixing, shaking and/or roll milling on a three-roll mill to obtain a uniform distribution of the ingredients in the thick film paste.

TABLE 3

| | Example Number | | | | |
|---|---|---|---|---|---|
| Ingredient | 1 Wt. % | 2 Wt. % | 3 Wt. % | 4 Wt. % | 5 Wt. % |
| Viox frit 24927 | 78.6 | 0 | 77.6 | 75.0 | 71.9 |
| Viox frit 24935 | 0 | 75.0 | 0 | 0 | 0 |
| Cab-O-Sil ® fumed silica | 0 | 0 | 0 | 0 | 0.8 |
| OV 1-1 | 7.1 | 8.3 | 0 | 0 | 0 |
| OV 2-1 | 0 | 0 | 8.6 | 0 | 0 |

TABLE 3-continued

| | Example Number | | | | |
|---|---|---|---|---|---|
| Ingredient | 1 Wt. % | 2 Wt. % | 3 Wt. % | 4 Wt. % | 5 Wt. % |
| OV 3 | 0 | 0 | 0 | 8.3 | 6.5 |
| Texanol ® solvent | 14.3 | 16.7 | 13.8 | 16.7 | 20.8 |
| Total | 100.00 | 100.00 | 100.00 | 100.00 | 100.00 |

TABLE 4

| | Example Number | | | | |
|---|---|---|---|---|---|
| Ingredient | 6 Wt. % | 7 Wt. % | 8 Wt. % | 9 Wt. % | 10 Wt. % |
| Viox frit 24927 | 64.7 | 85.2 | 85.2 | 73.8 | 73.8 |
| Frit d50 | 1.7 (μm) | 5 (μm) | 10 (μm) | 5 (μm) | 10 (μm) |
| Cab-O-Sil ® fumed silica | 2.9 | 0 | 0 | 1.6 | 1.6 |
| OV 1-1 | 0 | 5.7 | 5.7 | 8.2 | 8.2 |
| OV 2-1 | 7.2 | 0 | 0 | 0 | 0 |
| Texanol ® solvent | 25.2 | 9.1 | 9.1 | 16.4 | 16.4 |
| Total | 100.00 | 100.00 | 100.00 | 100.00 | 100.00 |

Examples 11~14

Table 5 summarizes the content of the compositions prepared for Examples 11~14 as various formulations of sealing compositions incorporating thermally fugitive OVs. These compositions are made into thick film pastes and tested for sealing performance between plates of soda-lime glass.

All of these compositions use glass frits obtained from DuPont (Wilmington Del.) that contain 77.0% PbO, 12.5% $B_2O_3$, 1.4% $Al_2O_3$ and 9.1% $SiO_2$. These compositions are made by a procedure similar to that set forth above for Example 1~10.

TABLE 5

| | Example Number | | | |
|---|---|---|---|---|
| Ingredient | 11 Wt. % | 12 Wt. % | 13 Wt. % | 14 Wt. % |
| DuPont frit | 81.8 | 81.8 | 77.9 | 74.4 |
| Cab-O-Sil ® fumed silica | 0 | 0 | 1.0 | 1.8 |
| OV 1-1 | 9.1 | 9.1 | 8.7 | 8.3 |
| Texanol ® solvent | 9.1 | 9.1 | 12.4 | 15.5 |
| Total | 100.00 | 100.00 | 100.00 | 100.00 |

Examples 15~18

Table 6 summarizes the content of the compositions prepared for Examples 15~18 as various formulations of sealing compositions incorporating thermally fugitive OVs. These compositions are made into thick film pastes and tested for sealing performance between plates of soda-lime glass.

All of these compositions use glass frits obtained from Asahi Corporation, Tokyo, Japan that contained PbO, $B_2O_3$, and $SiO_2$. Asahi frit number DT430 is used. These compositions are made by a procedure similar to that set forth above for Example 1~10.

TABLE 6

| | Example Number | | | |
|---|---|---|---|---|
| Ingredient | 15 Wt. % | 16 Wt. % | 17 Wt. % | 18 Wt % |
| Asahi DT430 frit | 91.0 | 91.2 | 91.5 | 92.2 |
| OV 1-2 | 5 | 4.9 | 4.7 | 5.9 |
| Texanol ® solvent | 4 | 3.9 | 3.8 | 1.9 |
| Total | 100 | 100 | 100 | 100 |

Examples 19~22

Table 7 summarizes the content of the compositions prepared for Examples 19~22 as various formulations of sealing compositions incorporating thermally fugitive OVs. These compositions are made into thick film pastes and tested for sealing performance between plates of soda-lime glass.

All of these compositions use glass frits obtained from Asahi Corporation, Tokyo, Japan that contained PbO, $B_2O_3$, and $SiO_2$. Asahi frit number DT430 is used. These compositions are made by a procedure similar to that set forth above for Example 1~10.

TABLE 7

| | Example Number | | | |
|---|---|---|---|---|
| Ingredient | 19 Wt % | 20 Wt % | 21 Wt. % | 22 Wt. % |
| Asahi DT430 frit | 90.9 | 91.1 | 91.4 | 91.5 |
| OV 1-3 | 3.6 | 3.6 | 3.4 | 0 |
| OV 2-2 | 0 | 0 | 0 | 5.0 |
| Texanol ® solvent | 5.5 | 5.3 | 5.2 | 3.5 |
| Total | 100 | 100 | 100 | 100 |

Each of the sealing compositions made as described above is printed through an 80 mesh screen in a 1.0"×1.0" "window frame" pattern on to 2.0"×2.0" soda-lime glass substrates. The samples are then dried in air at about 125° C. for 15 minutes. The screen printing is repeated a second and additional times on top of the dried prints, resulting in a thicker final print.

Alternatively, the sealing composition is extruded through a 12 gauge orifice onto the soda-lime glass substrates. Some of these tests are carried out on 5"×5" soda-lime glass substrates. Additional trials are run with the composition printed or extruded as a thick film paste onto glass coated with indium tin oxide (ITO). All samples with printed or extruded thick film paste are then dried in air at about 125° C. for 15 minutes.

Successful firing of the glass substrates on which each composition has been deposited as described above and dried is carried out according to the following protocol:

In a first step, firing occurs at a lower temperature (280° C. to 400° C.) to eliminate the bulk of the low firing organic vehicle. The low temperature firing may be carried out in air. However, the preferred mode is to carry out the firing in an inert atmosphere such as nitrogen to minimize oxidation of other components of the device being fabricated, when such components are an integral part of the glass plates which are being sealed together.

Then, in a second step, firing occurs at a higher temperature (360° C. to 480° C.) in an inert atmosphere (such as nitrogen) to sinter the glass frit and create a hermetic seal between the glass substrates. The sintering or higher temperature firing is carried out in an inert atmosphere to minimize oxidation of other components of the device being fabricated, when such components are an integral part of the glass plates, which are being sealed together. The tolerance for low levels (1-1,000 ppm) of oxygen in this firing step is solely dependent on the sensitivity of the other components of the device to oxygen.

All of the compositions evaluated as set forth above gave a good quality seal on the glass substrates.

What is claimed is:

1. A sealing process comprising:
   (a) depositing on a substrate comprising carbon nanotubes as emitter elements a bead or patterned layer of a composition of matter comprising, in admixture, (i) glass frit, (ii) a solvent, and (iii) an organic vehicle selected from one or more members of the group consisting of a polystyrene, a polyolefin, a polyacrylate, a polyester, a polycarbonate, a polyol, a polyether, a polyacetal and a polyamide; wherein the organic vehicle has a molecular weight in the range of about 200 to about 1000,
   (b) volatilizing the solvent and/or organic vehicle, and
   (c) firing the bead or patterned layer in the range of 360° C. to 480° C. to sinter the glass frit and create a hermetic seal.

2. A sealing process comprising:
   (a) depositing on a first substrate a bead or patterned layer of a composition of matter comprising, in admixture, (i) glass frit, (ii) a solvent, and (iii) an organic vehicle selected from one or more members of the group consisting of a polystyrene, a polyolefin, a polyacrylate, a polyester, a polycarbonate, a polyol, a polyether, a polyacetal and a polyamide; wherein the organic vehicle has a molecular weight in the range of about 200 to about 1000,
   (b) volatilizing the solvent and/or organic vehicle,
   (c) bringing a second substrate into contact with the bead or patterned layer, and
   (d) firing the bead or patterned layer in the range of 360° C. to 480° C. to sinter the glass frit and create a hermetic seal,
   wherein the first substrate or the second substrate comprises carbon nanotubes as emitter elements.

3. A process according to claim 1 wherein the firing is in a nitrogen or other inert atmosphere.

4. A process according to claim 2 wherein the firing is in a nitrogen or other inert atmosphere.

5. A process according to claim 1 wherein the substrate comprises electronic device elements.

6. A process according to claim 2 wherein the first and/or second substrates comprise electronic device elements.

7. A process according to claim 1 wherein the organic vehicle comprises a butylated poly(alpha-methylstyrene).

8. A process according to claim 1 wherein the organic vehicle comprises an indan.

9. A process according to claim 1 wherein the organic vehicle is selected from the group consisting of substituted alpha methyl styrene dimer, substituted alpha methyl styrene trimer, substituted 1,1,3-trimethyl-3-phenyl indan, t-butyl-1,1,3-trimethyl-3-phenyl indan, di-t-butyl-1,1,3-trimethyl-3-phenyl indan, substituted indan dimer, and substituted indan trimer.

10. A process according to claim 1 wherein the organic vehicle is derived from a methylmethacrylate.

11. A process according to claim 1 wherein the firing temperature is about 430° C. or lower.

12. A process according to claim 1 wherein the firing temperature is about 430° C. or lower.

13. A process according to claim 1 further comprising a step of subjecting the substrate to a high vacuum seal in a field emission device.

14. A process according to claim 2 further comprising a step of subjecting the substrates to a high vacuum seal in a field emission device.

* * * * *